F. E. WADE.
WATER COOLING ATTACHMENT FOR GAS ENGINES.
APPLICATION FILED OCT. 7, 1916.
1,250,055.
Patented Dec. 11, 1917.
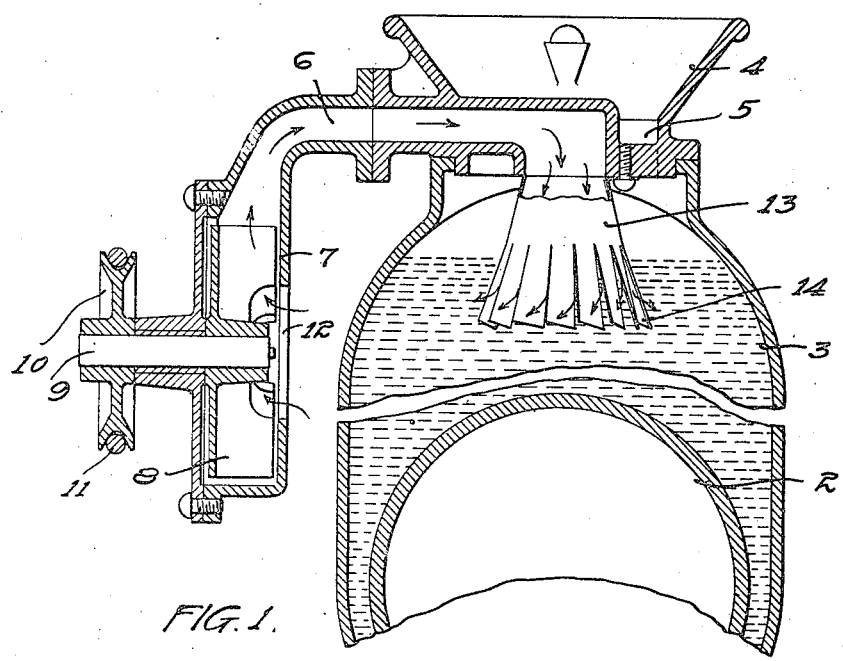
FIG. 1.
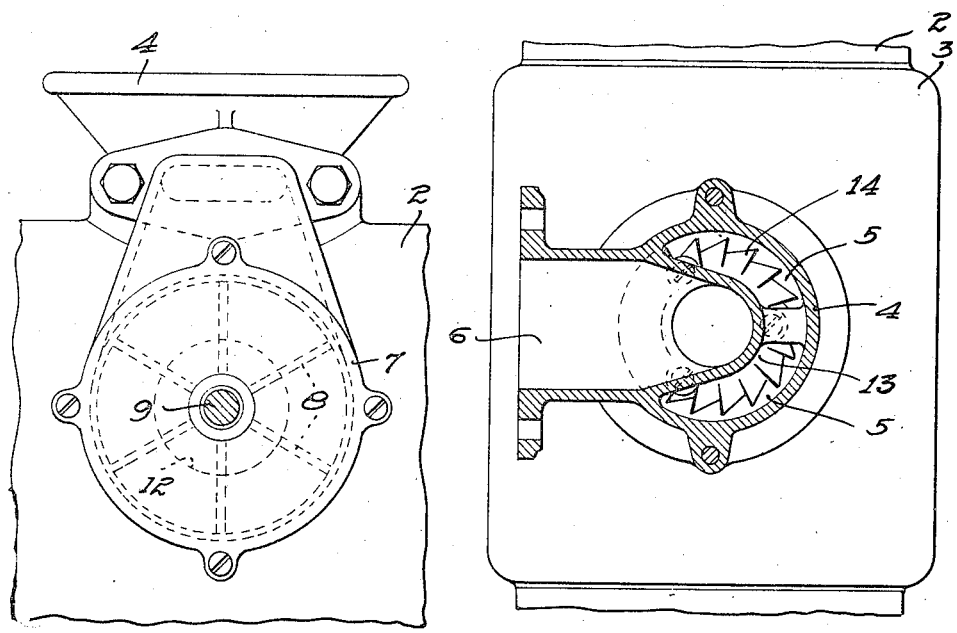
FIG. 2.
FIG. 3.
WITNESSES
INVENTOR
FRANK E. WADE
BY
ATTORNEYS

UNITED STATES PATENT OFFICE.

FRANK E. WADE, OF FAIRMONT, MINNESOTA, ASSIGNOR TO FAIRMONT GAS ENGINE & RAILWAY MOTOR CAR CO., OF FAIRMONT, MINNESOTA, A CORPORATION.

WATER-COOLING ATTACHMENT FOR GAS-ENGINES.

1,250,055.  Specification of Letters Patent.  Patented Dec. 11, 1917.

Application filed October 7, 1916. Serial No. 124,278.

*To all whom it may concern:*

Be it known that I, FRANK E. WADE, a citizen of the United States, resident of Fairmont, county of Martin, State of Minnesota, have invented certain new and useful Improvements in Water - Cooling Attachments for Gas-Engines, of which the following is a specification.

The object of my invention is to provide an attachment for a gas engine by means of which the water in the circulating tank can be kept cool.

A further object is to provide an attachment of simple construction and one which can be easily applied to a gas engine of the ordinary type.

The invention consists generally in various constructions and combinations, all as hereinafter described and particularly pointed out in the claims.

In the accompanying drawings forming part of this specification,

Figure 1 is a sectional view of a portion of a gas engine showing my invention applied thereto, Fig. 2 is a side view of the same, Fig. 3 is a plan sectional view.

In the drawing, 2 represents a cylinder of a gas engine, and 3 a water circulating tank therefor. This tank is provided with a filling funnel 4 and opening 5 through which steam may escape from the tank into the atmosphere. 6 is a passage leading from a casing 7 wherein a fan 8 is mounted on a shaft 9. 10 is a pulley on said shaft having a driving belt 11. The casing 7 has an ordinary air intake opening 12 and when the fan is revolved the air will be drawn in through said opening and discharged through the passage 6 into the tank 3. In the mouth of the passage I prefer to provide a cone-shaped device 13 having a series of blades 14 which depend into the water in the tank. These blades are twisted slightly on their longitudinal axes and when the air flows through the passage 6 and enters the cone-shaped member it will spread out and be deflected by these blades into the body of water in the tank and operate as a cooling spray to reduce the temperature of the water, the air finally escaping through the opening 5 in the top of the tank. Any steam that may form in the tank will be rapidly condensed by the currents of cold air entering the tank and the operator of the engine can easily keep the water at any desired temperature.

The fan can easily be stopped by removing the belt 11 at any time that the use of the cooling attachment is regarded as unnecessary.

I claim as my invention:

1. The combination, with a gas engine water cooling system, of means for projecting currents of air into the water therein and means for spraying or diffusing the air currents, said spraying means comprising a substantially cone-shaped device having depending blades, which are twisted slightly on their longitudinal axes, with narrow slits or openings between them.

2. The combination, with a gas engine cylinder, of a water tank therefor having an air duct leading thereto and a filling opening, a substantially cone-shaped member depending within the water in said tank and communicating with said duct, and having a series of blades formed therein for diffusing the currents of air in the water, and means for delivering currents of cool air to said blades.

3. The combination, with a gas engine water cooling system, of means for projecting currents of cool air therein and means including a series of blades having narrow slots or openings between them and projecting into the water in said system and communicating with said air projecting means for diffusing the air throughout the body of water in said system.

In witness whereof, I have hereunto set my hand this 4th day of October 1916.

FRANK E. WADE.